United States Patent

[11] 3,578,088

| [72] | Inventor | Roedolf Johannes Raath<br>286 Deverish Street, Pretoria, Transvaal Province, Republic of South Africa |
|---|---|---|
| [21] | Appl. No. | 819,024 |
| [22] | Filed | Apr. 24, 1969 |
| [45] | Patented | May 11, 1971 |
| [32] | Priority | Apr. 26, 1968 |
| [33] | | Republic of South Africa |
| [31] | | 68-2696 |

[54] PLANT HARVESTING MACHINE
6 Claims, 7 Drawing Figs.

[52] U.S. Cl. .................................................. 171/62
[51] Int. Cl. ............................................. A01d 17/10
[50] Field of Search .......................................... 171/27, 50, 55—62

[56] References Cited
UNITED STATES PATENTS

| 1,194,189 | 8/1916 | Kincaid | 171/59 |
| 1,631,612 | 6/1927 | Allingham | 171/61 |
| 2,956,628 | 10/1960 | Rogers et al. | 171/60 |
| 3,181,617 | 4/1965 | Wallace | 171/61 |

*Primary Examiner*—Antonio F. Guida
*Attorney*—Karl W. Flocks

ABSTRACT: The invention relates to a machine for the harvesting of plants and more particularly pulling groundnut plants from the soil and gathering such plants according to an orderly arrangement.

The machine according to the invention provides a beltlike conveyor, disposed at an angle to the direction of travel of the machine, spaced fingers projecting from an edge of the conveyor, and plant guide means forwardly divergingly disposed relative to the conveyor for directing and holding the plants between fingers and against the conveyor so that the plants are pulled upwardly at the position when the conveyor commences upward movement. With the conveyor means are provided to remove extracted plants for orderly side by side collection on a surface. In addition means are provided for discharge of the plants with the root ends directed in the same directions.

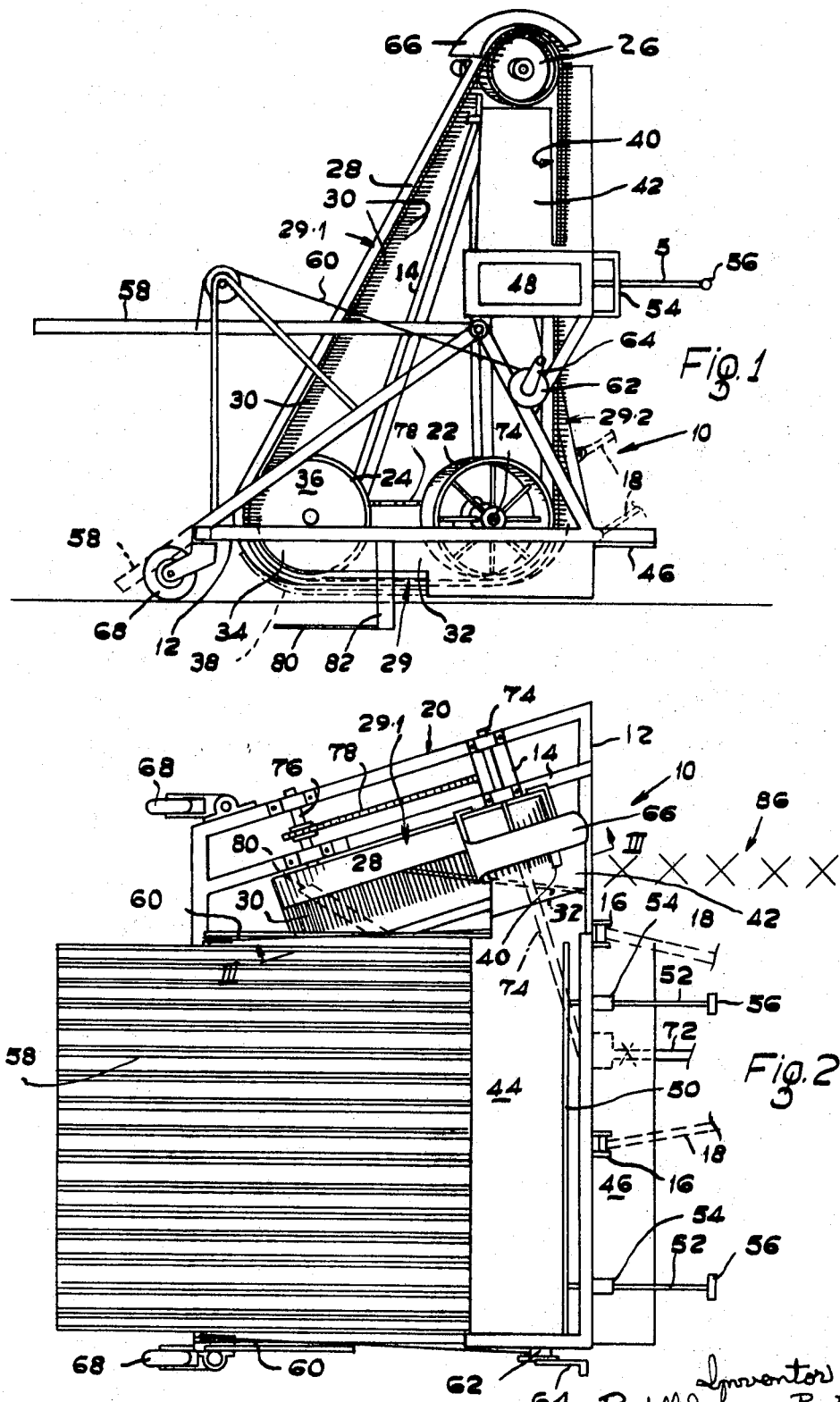

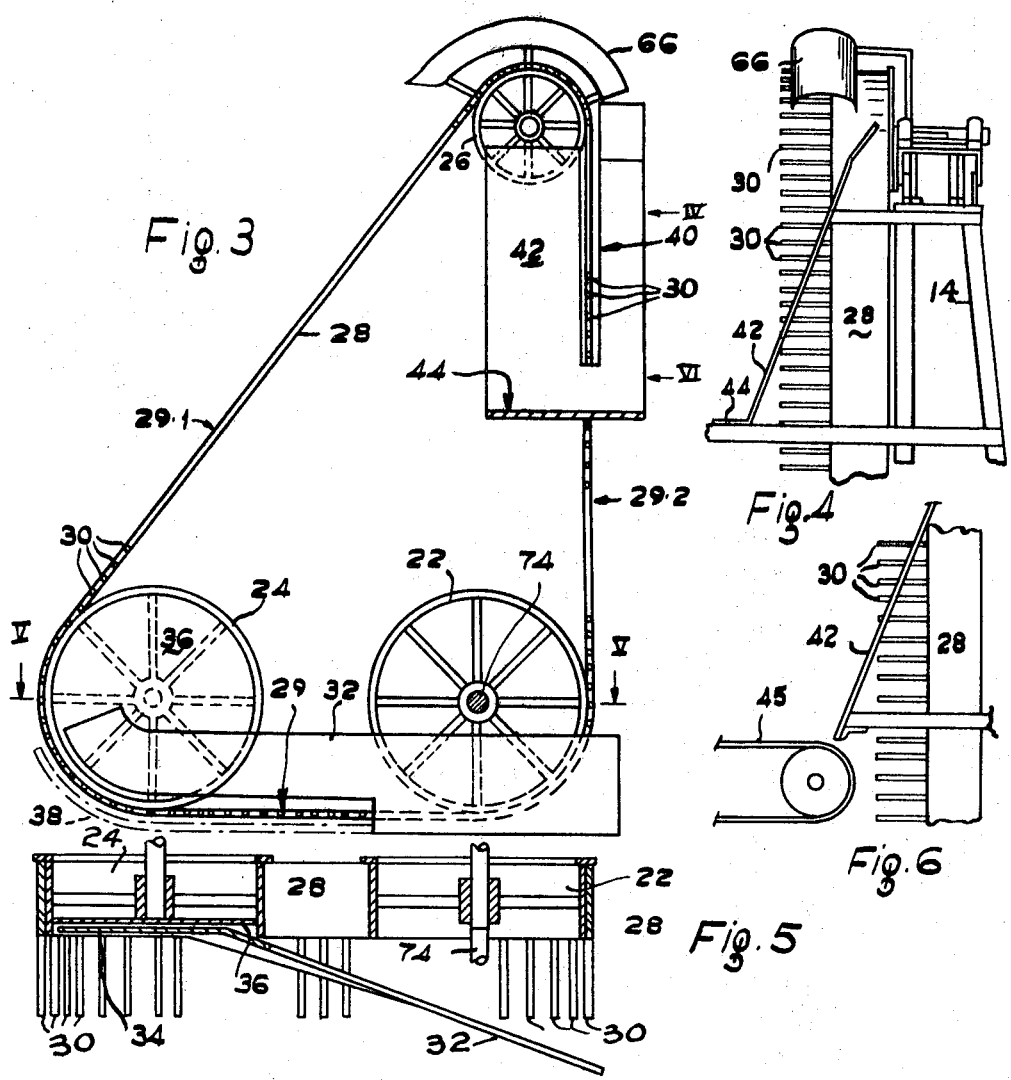

3,578,088

PLANT HARVESTING MACHINE

BACKGROUND OF THE INVENTION

1. Field of the Invention

The invention falls within the filed of agricultural machines for harvesting groundnut plants which must be pulled from the soil.

2. Description of the prior art

Machine for harvesting groundnut plants known to the applicant provide pairs of coacting movable elements between which the plants are gripped and subsequently pulled but these generally do not provide a sufficient grip for the purpose. Machines providing grid like conveyors onto which plants and soil are fed from a share are also known but with these machines considerable wear take place.

It is an object of the invention to provide a plant harvesting machine in which these disadvantages may be avoided or reduced.

SUMMARY OF THE INVENTION

According to the invention a mobile machine is provided for drawing plants from the soil and which includes a frame, a driven endless conveyor member mounted on the frame obliquely relative to the direction of movement of the machine and having a lowermost portion substantially parallel to the surface of the soil, rigid spaced elements on a projecting outwardly from a side of the conveyor member and of which those elements on the said portion of the conveyor member are disposed substantially parallel and close to the surface of the soil, plant guide means on the frame and arranged in forward diverging relationship with the said portion of the conveyor member and adapted to force standing plants between the spaced elements and clampingly onto the conveyor member, and means for driving the conveyor member with the said portion of the conveyor member moving in a direction opposite to the direction at a speed substantially equal to the speed of travel of the machine whereby stems of standing plants at positions close to the soil become firmly held by the protruding elements and against the conveyor member for such plants to be subsequently drawn from the soil when the conveyor member moves upwardly.

The endless conveyor member is passed over a pair of horizontally spaced pulleys and on moving upwardly over the rearmost pulley a pulling force is applied to the plants held by the member. For maintenance of the clamping action on the plants stems while the pulling force is applied to the plants, the rear end portion of a plate, forming the guide members and disposed parallel with the conveyor member, is curved upwardly. On forward movement of the machine the guide means is adapted to force the plant stems between the protruding elements to be combed therein and further force the stems along the elements and onto the conveyor member.

An upper portion of the conveyor member with its projecting elements are arranged to move past means adapted to slide the plants, after fully extracted from the soil and free of the said guide means, away from the conveyor member and off the protruding elements. Advantageously the conveyor member is passed over at least one pulley mounted at an elevated position while the means for removing the plants from the said conveyor member is at a position between an elevated and the front lower conveyor member pulleys.

The plant material is removed from the conveyor member and the projecting elements in an orderly fashion onto receiving means from whence such orderly arranged extracted plants may be transferred onto a platform or the like from which plants may be periodically discharged, still in an orderly fashion, to facilitate further handling or treatment of such plant material.

The conveyor member may be a flexible and may comprise a belt or a chain.

The oblique positioning of the conveyor member is at an acute angle relative to the direction of motion of the machine while the standing plants, planted in rows are firstly engaged by the guide means before becoming engaged by the projecting elements of the conveyor member. Said projection elements may comprise a plurality of closely spaced rigid rods of bars extending cantilever fashion, from one side of the conveyor member.

In one form the removal of extracted plants from the conveyor member and projecting elements may be by means of an additional endless conveyor member which is arranged for substantial horizontal operation and having upwardly directed projecting elements and of which a portion is adapted to cross a downwardly moving portion of the first conveyor member. Plants carried downwardly by the first mentioned conveyor member are combed into the projecting elements of the additional conveyor member and are then transferred sidewardly, for removal from the additional conveyor member by sloping stationary cam forming surfaces between which the additional conveyor member is adapted to move.

The plant material removed from the conveyor member (or the additional conveyor member); and when completely released by the projecting elements, is onto a platform and whereon the plant material is gathered in an orderly fashion, adjacent one another. A gathering trough, which may have partitions, and/or chutes may be provided in which the plant material are arranged manually or mechanically. The gathering trough may have a tiltable bottom for periodic discharge of the material thereon when downwardly tilted. If the root systems of the plants and the soil from which the plants are to be extracted require the use of means for cutting off tap roots, a cutting blade or share may be attached to the fame and arranged to operate below the soil surface for severing the tap roots of the plants after the plants have become tightly held by the conveyor member and the projecting elements.

The conveyor member or members may be driven by at least one wheel on which the machine may be carried and through chain and sprocket or like transmission systems. Alternatively the conveyor member or members may be driven from a suitable power source.

The machine according to the invention is particularly suitable for attachment in elevatable and lowerable fashion on a tractor of the like. With such arrangement the frame may be provided with wheels, advantageously caster type wheels, adapted to run on the soil surface when the machine is in operation. The conveyor member or members with the guide means are preferably mounted on one side of the frame whereas the plant gathering trough or such like structure is disposed on the remaining portion of the frame which, when attached to a tractor or the like is disposed behind the tractor while the said conveyor member or member and associated parts are disposed sidewardly of the tractor.

In order that the invention may be clearly understood and carried into effect reference will now be made to the accompanying sheets of drawings.

In the drawings:

FIG. 1 is a side elevation of an agricultural machine constructed according to the invention for drawing, raising and orderly gathering groundnut plants;

FIG. 2 is a plan of FIG. 1;

FIG. 3 is a diagrammatic sectional view on line III—III of FIG. 2;

FIG. 4 is a fragmentary elevation of the upper portion of FIG. 3 in direction IV;

FIG. 5 is a section on line V—V of FIG. 3;

FIG. 6 is a fragmentary elevation of FIG. 3 in direction VI and shows a modification; and FIG. 7 is a diagrammatic pictorial view showing a modified form of the machine according to the invention.

Referring to the FIGS. 1 to 5 reference numeral 10 denotes generally a machine for pulling, elevating and gathering groundnut plants. The machine comprises a rigid frame 12 mounting a superstructure 14. On the front of the machine coupling pins 16 are mounted for attachment of the machine to the link arms 18 of a three point lift system of a tractor. Towards one end 20 of the frame 12 a pair of horizontally spaced pulleys 22, 24 are rotatably mounted with the pulley 22 forwardly of and in spaced relationship to the pulley 24. At the upper portion of the superstructure 14 a third pulley 26 is freely rotatably mounted. The inwardly directed edge faces of the pulleys 22, 24 and 26 are arranged in a common plane. Said plane is arranged at an acute angle relative to the direction of movement of the machine when in operation. Such angle is in the order of 18°.

A wide belt 28 is carried on the pulleys 22, 24 and 26 and is arranged to form substantially horizontal bottom operative run 29, an upwardly and forwardly moving run 29.1 and a substantially vertical downwardly moving run 29.2.

On the belt 28 a large number of closely spaced rigid protecting elements or fingers 30 are provided which extend perpendicularly and in cantilever fashion from the inwardly directed edge of the belt 28. Said fingers 30 in respect of the horizontal run, are adapted to move substantially parallel to the land surface and advantageously in close spaced relationship thereto.

On the frame 12 a downwardly projecting plant guide 32 is fixed. Said plate 32 is mounted substantially vertically and substantially in the direction of movement of the machine and has its front portion forwardly diverging relative to the side of the belt 28 from which the fingers 30 project. The front portion of said plate 32 is spaced relative to the path followed by the tips of the fingers 30 and converges rearwardly towards the said edge of the belt from where the rear portion of the plate extends substantially in the plane of the edge of the belt 28. The fingers 30 are adapted to move below the bottom edge of at least the rear portion of the guide plate 32. The rearmost portion 34 of plate 32 is of upwardly arcuate shape and terminates just below a plane containing the axes of the pulleys 22 and 24.

On the outwardly directed sides of the pulleys 22, 24 flanges are provided to prevent outward axial displacement of the belt 28 from the pulleys due to sideward thrust to which at least the horizontal run 29 of the belt is subjected during operation.

The said rear portion of the guide plate 32, which is disposed parallel with the edge of the belt 28 may be disposed with clearance relative to the belt and preferably slightly inwardly of the edge face of the belt so that plant stems become bent over to a limited extent to facilitate the holding action on the plants. The inwardly directed side of pulleys 24 is provided with a covering plate 36 close to the side adjacent which the said rear portion 34 of plate 32 is disposed and whereby, the carrying of rigid elongated material, such as sticks or the like, by the conveyor belt 28 and fingers 30 may be eliminated.

If desired, or if found necessary, the guide plate 32 may be provided with a groove in the rear portion through which the fingers 30 may move. Such groove may be formed by a rigid rod or bar fixed to the frame and with its front end to the plate 32. With such provision the plant stems may be bent to substantially S-formation to obtain increased holding actions on the plant stems.

The upper portion of the downwardly moving run 29.2 of the belt 28 and the fingers 30 is through a slot 40 provided in a steeply inclined pal plant extracting plate 42 so that downwardly moving extracted plant material, held by the fingers 30 are stripped or slid from the fingers 30 and, when free of such fingers, are received on one end of a transversely disposed substantially horizontal platform 44. The said sloping extractor plate 42 acts after the fashion of a stationary cam.

The horizontal transverse platform 44 is also supported on the frame 12. The released material gathering on the end of the platform 44 is manually slid along the platform, by workers carried by the machine and standing on a platform 46. Across the far end of the platform 44 an end wall 48 is provided. At the front of the platform 44 a movable panel 50 is disposed. The lower edge of the panel 50 is slidable on the platform 44 while forwardly directed bars 52 are attached to the panel 50. The bars 52 are slidably guided in guides 54. On the free end of the bars 52 handles 56 are formed whereby the panel 50 may be manually moved across the platform 44, for sliding the plant material carried by the platform therefrom.

Rearwardly of the platform 44 a tiltable platform 58 is provided on which the plant material is periodically transferred by the panel 50 from the platform 44. Rows of adjacently positioned plants forced successively onto the tiltably platform 58 causes preceeding rows on platform 58 to be forced toward the rear edge of the platform 58. The upper face of the platform 58 is preferably ribbed or corrugated from the front towards the rear to resist lateral movement of plant material thereon.

The tiltable platform 58 is normally carried in a substantially horizontal position. When fully loaded the rear end is caused to drop downwardly for the plants carried by such platform to slide therefrom and onto the land substantially in the order and arrangement as they were on the platform.

The platform 58 may be supported in its horizontal position by a pair of cables 60 which extends from drums 62 provided on a horizontal shaft (not shown) mounted below the platform 44 and having a crank handle 64 at a readily accessible position for a worker standing on the platform 46. With a drum 62 a retractable locking part (not shown) is provided to retain the platform in the horizontal position.

In spaced relationship across the upper pulley 26 a curved cowling 66, of curve cross-sectional shape, is mounted to prevent loss of plant material by centrifugal force.

The tiltable platform 58 may be pivotally mounted in and biassed to a substantially horizontal position and when substantially fully loaded is caused to automatically tilt to its discharging position. In the tilted position it may be automatically locked by a spring biased catch device which is manually retracted after complete discharge of the plant material from the platform for automatic return of the platform to it normal substantially horizontal position.

Below the upwardly moving sloping run 29.1 of the belt 28, a slopingly disposed and transversely inclined plate is preferably mounted for directing soil, dropping from, the extracted and upwardly moving plant material, away from the bottom horizontal run 29 of the belt 28 and the pulleys 22 and 24.

On the frame 12 castor wheels 68 are advantageously provided to support the frame when in operative position and whereby the horizontal run 29 of the belt 28 may be maintained at a desired spaced position relative to the land surface. Said castor wheels 68 may be attached to the frame 12 in adjustable fashion in order to vary the height of the frame above the land surface when in operation.

The pulley 22 may be driven from a shaft 72 which is coupled, in the known fashion, to the power takeoff shaft of the tractor to which the machine is connected by the link arms 18. The shaft 72 and the shaft 74 of the pulley 22 are connected through gear means so that the circumferential speed of the pulley 22 and the speed of the belt 28 will be the same as the land speed of the machine. The movement of the run 29 of belt 28 is however is a rearward direction.

The pulley 24 should have the rotary drive applied to it in order to maintain the run 29 taut. For such purpose a chain drive 78 is provided to the shaft 76 of pulley 24. If it is desired that no drive should be applied to pulley 22 said pulley may rotate free on the shaft 74.

A blade 80 is also provided for operation below the soil surface for cutting off the tap roots of the tap roots of the groundnut plants to facilitate the extracting action under conditions where this is necessary. The share 80 may comprise a flat plate having a cutting edge on its front end and which is fixed by at least one end to a downwardly extending mounting arm 82 which in turn should adjustably fixable to the frame 12 in order to vary the depth of operation of the blade 80.

Referring to FIG. 6, the modification shown comprises a belt conveyor 45 on which the plants, removed from the fingers 30 of belt 28 on the downwardly moving run 29.2, are received. Said conveyor belt 45 can be used instead of the platform 44. The aforesaid panel 30 is adapted to move transversely across the upper run of the conveyor 45 for pushing the plants onto the tiltable platform 58. With the arrangement the adjacent plants on the belt may be compacted onto one another before transference to platform 58.

The modification shown in FIG. 7 provides for additional conveyor member 28.1 which is arranged for horizontal operation and is provided with upwardly projecting fingers 30. The run 29.4 of member 28.1 is across the downwardly moving run 29.2 of the belt 28 in close spaced relationship. The fingers 30 are preferably of the same length as the fingers 30 of the belt 28. The belts 28 and 28.1 are driven at the same speed. The plants carried by the belt 28 on its fingers 30 along the downwardly moving run 29.2 are received in the fingers 30 of the belt 28.1 and as such plants move deeper along the fingers of belt 28.1 they are simultaneously drawn in a lateral direction off the fingers of belt 28.

With the bottom run 29 of belt 28 the aforesaid guiding or directing plate 32 is associated.

The removal of plants from run 29.5 of the conveyor member or belt 28.1 is by means of a sloping plate 92 having a slot 94 through which the upper portion of the belt 28.1 and the fingers 30 are movable. Due to the plate 92 being slopingly disposed with reference to the ends of the fingers, the plants are raised by the sloping surface from the fingers as the fingers move through the slop 94. The sloping plate 92 may flow onto a platform 96 on which the plants 98 are gathered after such plants slide over the sloping plate 92. With the platform 96 the movable panel 50 may be associated or such other like or suitable means.

If desired the run 29.4 of the belt 28.1 may extend for an appreciable distance from the run 29.2 of belt 28 before commencing a return run. With the said portion the sloping and slotted plane 92 and platform 96 may be associated. The plants may be transferred from the platform 96 onto a tiltable platform 58 as previously described.

In operation the machine 10 is drawn across a land. The plants in a row 86 are received in the forwardly divergent space between the belt 28 moving in direction 88, and the guide plate 32 and are forced by the plate 32 between the fingers 30 of the conveyor belt 28 to become pressed against the belt and/or wedged between the fingers 30. The blade or share 80 is arranged to cut the tap roots of the groundnut plants and the plants are then drawn from the soil by the belt 28 as it commences its upward travel. The extracted plants are transported by the belt with the root ends or nut bunches directly outwardly and with the foliage directed inwardly. When the conveyor moves through the slot 40 of plate 42 the plants conveyed by the belt are withdrawn in a lateral direction and are received on the platform 44 with the root ends or nut bunches directed forwardly and the foliage directed rearwardly. The plants are described adjacent and on top of one another and are moved manually in such positions along the platform 44. When the platform, in front of the panel 50 is full, the panel 50 is manually moved rearwardly for transferring such orderly arranged plants onto the tiltable platform 58. Successive rows of adjacent plants, when forced off the platform 48, forces the preceeding row of plants along the tiltable platform 58. When the platform 58 is completely covered with orderly arranged rows of plants, the platform is caused to tilt downwardly for discharge of the plants on top of the land.

Due to the orderly location or arrangement of the plants, further handling, such as packing of the plants, in heaps in a specific manner, by way of example with the roots inwardly and the foliage outwardly, is greatly facilitated. Also the picking up of such discharged plants from the land by mechanical means is also greatly facilitated due to such orderly arrangement of the plants.

With the modified means as shown in FIG. 7 the plants conveyed by the belt 28 and along the downwardly moving run 29.2 become combed into the teeth 30 of the belt 28.1 so that the plants are transferred from the belt 28 to the belt 28.1. The roots ends of or nut branches 100 of the plants 98 are still outwardly directed and the foliage inwardly directed.

The belt 28.1 moves through the slot 94 in the sloping plate 92. The movement of the teeth 30 through the slot 94 causes the plants 98 to be raised for release from the teeth 30 for gathering on the platform 96. The plants 98 which collect on the platform 96 have their root ends or nut bunches 100 all directed in the same direction. Hereafter the plants may be gathered, arranged and discharged substantially as previously described.

The machine may be constructed to operate on more than one row of plants at the same time.

The machine may also be constructed as a self propelled unit.

We claim:

1. A machine for drawing plants from the soil comprising: an elevatable and lowerable frame having a front end and a rear end and being movable across the soil along a row of standing crop plants; three spaced pulleys rotatably mounted on the frame about parallel horizontal axes and of which one pulley is disposed towards the front of the frame, a second pulley towards the rear of the frame and a third pulley at an elevated position substantially above the first pulley while the said axes are at an obtuse angle relative to the operational direction of movement of the machine; a flexible endless conveyor member on the pulleys and having rigid spaced elements projecting outwardly from one side and arranged to project in axial directions beyond aligned side faces of the pulleys when passing over the pulleys, said conveyor member having a portion extending between the first and the second pulleys located horizontally and at an acute angle relative to the direction of movement of the machine and being further adapted for location substantially parallel to the surface of the soil, a portion between the second and the third pulleys slopingly disposed and a portion between the third and the first pulley substantially vertically disposed; a motion transmission mechanism from a power source to one of the pulleys for driving the conveyor member with the horizontal portion moving rearwardly and the vertical portion moving downwardly; substantially horizontal plant guide means on the frame located with the front portion in forwardly diverging relationship to the horizontal portion of the conveyor member and adapted to force standing plates between the spaced elements; a covering plate of that side of the second pulley beyond which the elements of the conveyor member projects when moving over the pulley; a rear portion of the guide means presenting an upwardly curved arcuately shaped face forming part disposed parallel to and with small clearance across the upwardly moving portion of the covering plate of the second pulley and attached to facilitate the holding of the plants against the side of the conveyor member and the covering plate during the initial upward movement of the conveyor member for pulling the plants from the soil; and means operatively associated with downwardly moving portion of the conveyor member for withdrawing and discharging plants, engaged and carried by the projecting elements of the conveyor member, and the projecting elements thereof in a substantially lateral direction.

2. A machine as claimed in claim 1 wherein the means for withdrawing and discharging the plants from the projecting elements of the conveyor member includes a sloping surface, a slot in the sloping surface through which the downwardly moving portion of the conveyor member and the projecting elements thereof are arranged to move with clearance, and a plant collecting surface extending from a lower part of the sloping surface, said sloping surface forming stationary cam means adapted to effect movement of the plants when sliding thereon in a direction away from the conveyor member and completely off the projecting elements for orderly discharge of the plants in side by side fashion on the collecting surface with the root ends of the plants all in the same direction.

3. A machine as claimed in claim 1 wherein the means for withdrawing plants from the projecting elements of the downwardly moving portion of the conveyor member comprises, an additional endless conveyor member arranged for substantially horizontal operation and having upwardly directed projecting elements and of which conveyor member a portion is arranged to cross the downwardly moving portion of the first mentioned conveyor member whereby plants carried downwardly by the first mentioned conveyor member are combed into the projecting elements of the additional conveyor member which transfers the plants in a sideward direction, upward sloping stationary cam forming surfaces between which the said additional conveyor member is movable for lifting the plants from the upwardly projecting elements of the additional conveyor member, and a platform extending from elevated portions of the sloping surfaces for collection thereon of the plants in an orderly side by side fashion with all the root ends directed in the same direction.

4. A machine as claimed in claim 1 wherein a plant transferring device is associated with a horizontal surface on which the plants are received when withdrawn from the projecting elements of the conveyor member, said plants being received in side by side relationship after release from the conveyor member and projecting elements while said transferring device is adapted to periodically force rows of adjacent plants transversely from the said surface.

5. A machine as claimed in claim 1 wherein a tiltable platform is provided onto which orderly arranged rows of plants are intermittently fed to form orderly rows transversely across the platform, said platform being displaceable to a sloping position for sliding discharge of the plants therefrom according to the said orderly arrangement of plants.

6. A machine as claimed in claim 1 wherein the frame is attached in elevatable and lowerable fashion to a vehicle, the conveyor member and guide means being mounted at one side of the frame whereas the means for receiving the plants withdrawn and discharged from the projecting elements of the conveyor member are mounted on the remaining portion of the frame.